J. T. FAGAN.
MACHINE FOR MAKING HOOKS.
APPLICATION FILED OCT. 15, 1908.
1,002,662.
Patented Sept. 5, 1911.
5 SHEETS—SHEET 5.
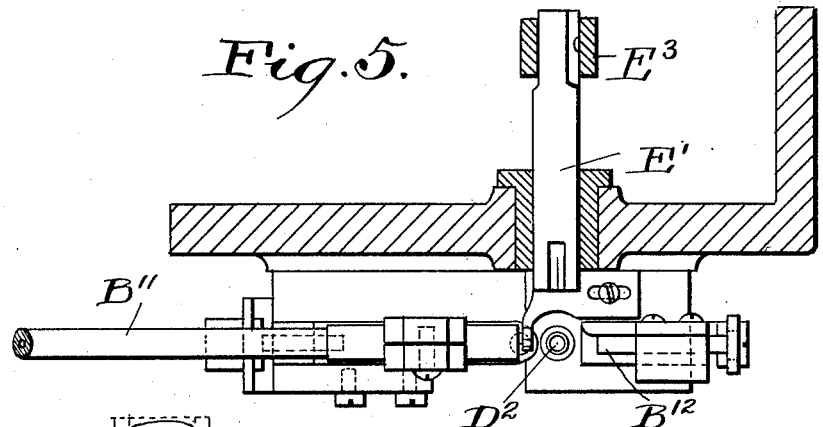
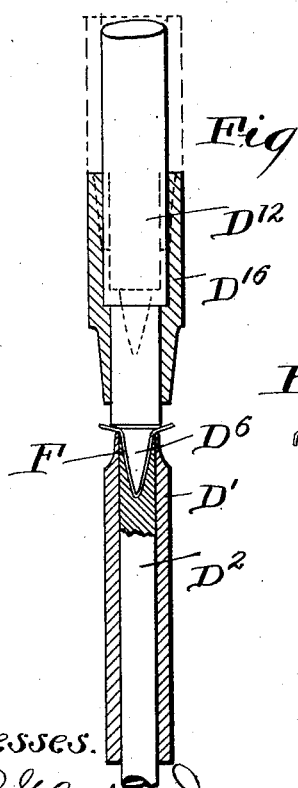
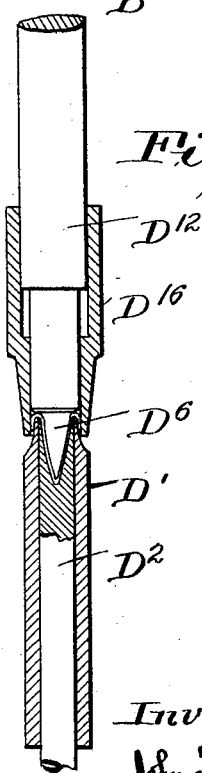

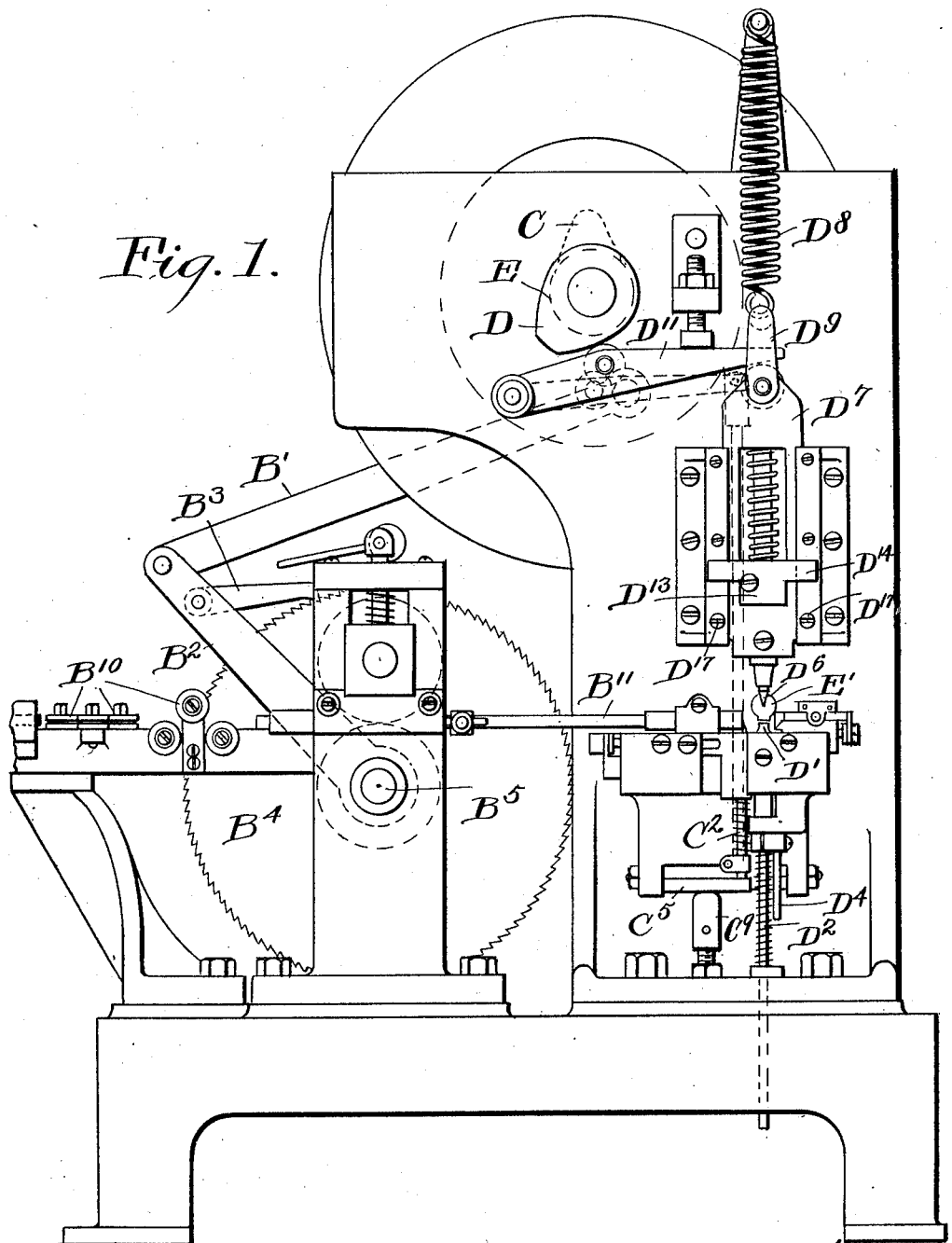

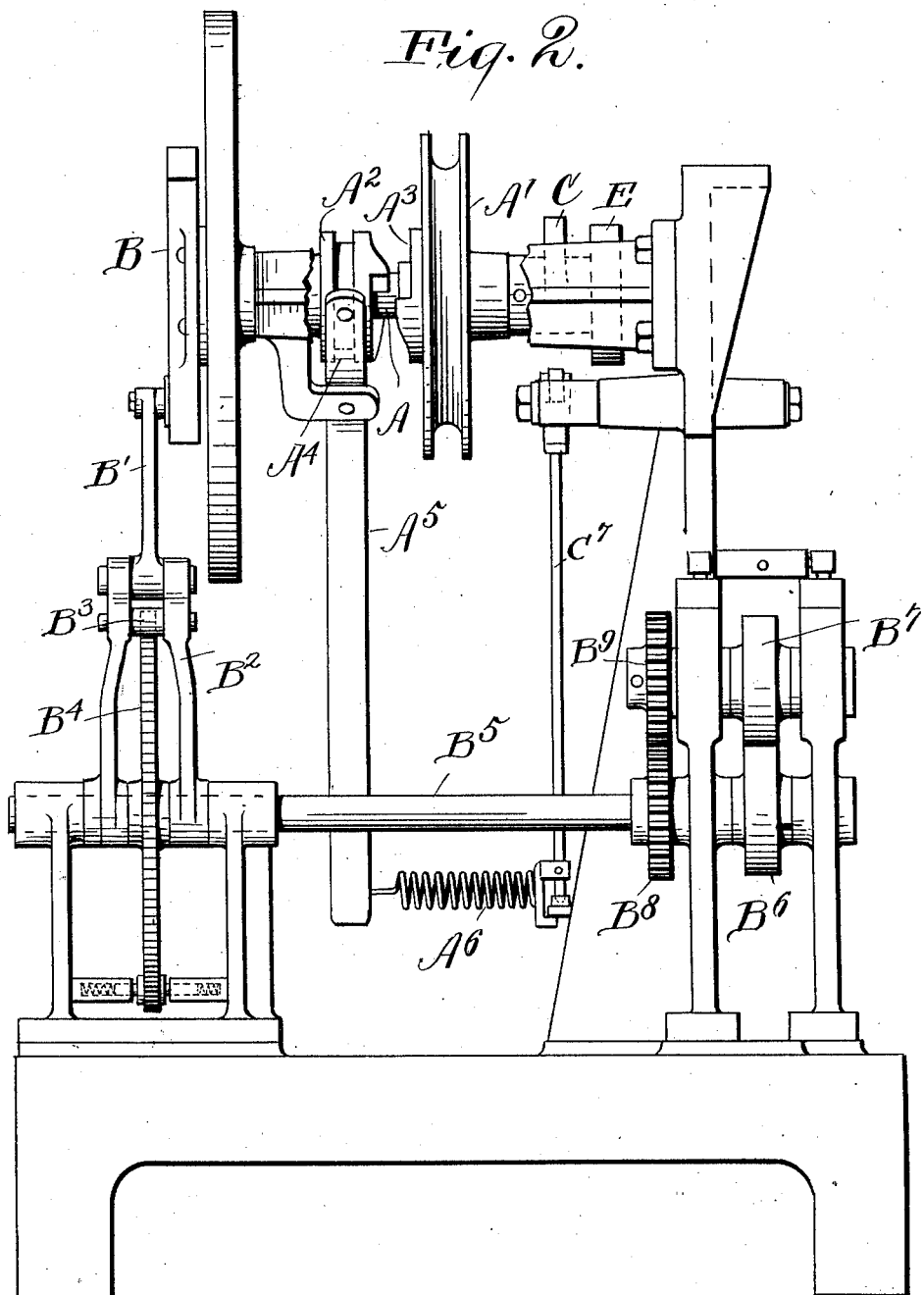

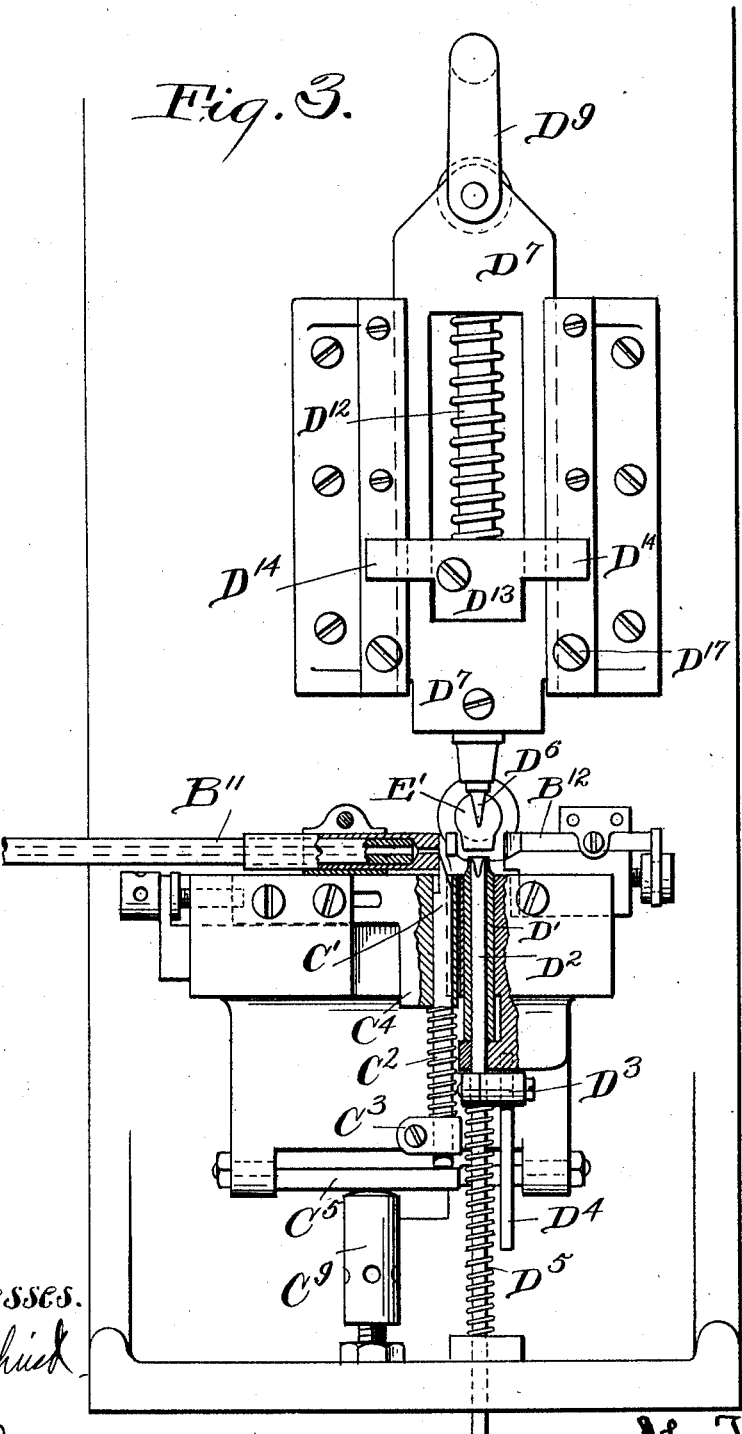

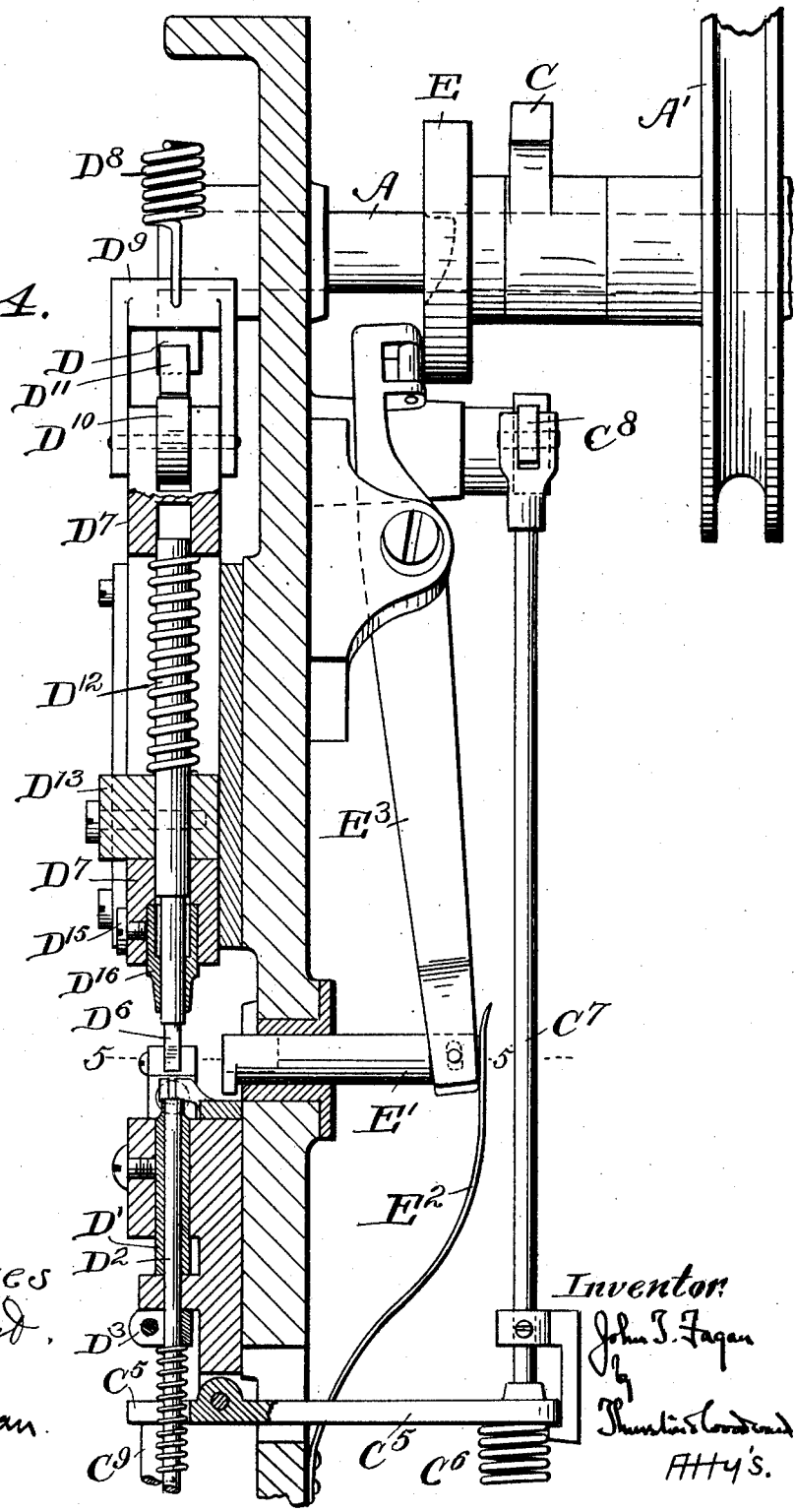

UNITED STATES PATENT OFFICE.

JOHN T. FAGAN, OF CLEVELAND, OHIO.

MACHINE FOR MAKING HOOKS.

1,002,662.  Specification of Letters Patent.  Patented Sept. 5, 1911.

Application filed October 15, 1908. Serial No. 457,796.

*To all whom it may concern:*

Be it known that I, JOHN T. FAGAN, a citizen of the United States, residing at Cleveland, in the county of Cuyahoga and State of Ohio, have invented a certain new and useful Improvement in Machines for Making Hooks, of which the following is a full, clear, and exact description.

The present invention is directed to a machine for making V-shaped double hooks such as are used for anchor wires in tantalum lamps.

The object of the invention has been to produce a machine which shall manufacture these hooks from a continuous wire, automatically, without the necessity for intervention or manipulation on the part of the operator.

The above and other desirable objects it will be seen are attained by that embodiment of my invention illustrated in the accompanying drawings, in which:

Figure 1 is a front elevation of a machine constructed in accordance with my inventive idea. Fig. 2 is an end elevation of the same. Fig. 3 is an enlarged front elevation partly in section illustrating the mechanism for shaping the hook. Fig. 4 is a vertical section of the mechanism illustrated in Fig. 3. Fig. 5 is a horizontal section on the line 5—5 of Fig. 4. Fig. 6 is an enlarged vertical section showing the plunger and die in the first step of forming a V double hook. Fig. 7 is a similar view showing the position of the parts in the second step. Fig. 8 is a perspective view of a hook made by my machine.

The machine here illustrated is mounted on a suitable bed plate and has supporting standards fixed to said plate in which is mounted a transverse shaft A receiving rotary motion through a pulley wheel A' from a convenient source of power. Slidingly keyed to said shaft is a clutch $A^2$ adapted to engage a corresponding clutch member $A^3$ fixed to said pulley wheel, said sliding clutch being operated by a yoke $A^4$ on the end of a lever $A^5$, which lever is under the constant tension of a spring $A^6$ tending to throw the said clutch out of engagement with the pulley wheel. When the clutch is in engagement, however, a suitable catch, not shown, may be provided for retaining the lever in proper position against the tension of said spring.

The shaft rotated by the means above described has mounted thereon several cams C, D and E for operating the different parts of the mechanism, and also has fixed thereto a disk B or other suitable rigid part having pivoted at some eccentric point a connecting rod B' pivotally connected at its outer end to oscillating arms $B^2$ which, through the medium of a pawl $B^3$ gives an intermittent motion to a ratchet wheel $B^4$ fixed to a transversely mounted feed shaft $B^5$. This feed shaft has near one end a friction feed roll $B^6$ coöperating with a second feed roll $B^7$ adjacent thereto, the second feed roll being given rotary motion through the medium of a pair of spur gears $B^8$, $B^9$ fixed respectively to the feed shaft and to the jack shaft on which the second roll is mounted. The wire F to be operated upon is drawn from an adjacent reel, not shown, through ordinary straightening devices $B^{10}$ by means of said feed rolls, is conducted forward therefrom through a guide tube $B^{11}$ and passes from said tube between a plunger and a die and over a severing knife adapted to cut short lengths therefrom.

Lying immediately in front of the exit end of the guide tube is a reciprocating knife C' designed to have an intermittent reciprocation for the purpose of severing the length of wire projecting from the feed tube, the said length being dependent upon the intermittent rotation of the feed roll.

The knife here shown is at the upper end of a rod $C^2$ having a collar $C^3$ secured at the lower end thereof with a compression spring interposed between a shoulder on the guiding frame $C^4$ and the collar. Said spring thus throws the knife rod downward so that its lower end bears upon the broad forward end of a rocking arm $C^5$, the rear end of which is moved upward by a coiled spring $C^6$ on which it rests and downward by a vertical rod $C^7$ pivoted to a horizontal link $C^8$ intermittently wiped by the cam C fixed to the operating shaft. When the cam is not in engagement with the said link, the coiled spring $C^6$ will throw the rocking lever $C^5$ up at its rear end and down at its forward end. I provide a stop $C^9$ at the forward end to limit the downward throw of the forward end on which the knife rod rests. By this arrangement the knife rod will always be retracted a sufficient extent for the knife to clear the exit end of the guiding conduit for the wire, and the oscillating arm $C^5$ will always be held up into the path of the cam; the said cam being timed, of course, to throw the knife up after the feeding step has been completed. It will be noted that the guide $C^4$ for the knife is mounted in the frame so as to be laterally adjustable, this being necessary in order that it may follow the adjustable guide tube when it is desired to shift these parts for the purpose of increasing or diminishing the length of wire cut. As each length of wire is cut it will rest upon the upper edge of a die between the end of the exit tube and a guiding member $B^{12}$ on the opposite side of the die. At the moment when this length is severed, the hook making plunger and die are brought into operation.

The die itself comprises a sleeve $D'$ suitably mounted and positioned in a frame and having within itself a movable rod $D^2$ with a V-shaped socket at its upper end. The said yielding rod has a collar $D^3$ fixed thereon, which collar has a guide pin $D^4$ depending therefrom at one side and passing into an opening in an adjacent portion of the frame above the collar. This collar and its eccentrically located guide pin are provided for the purpose of preventing the vertically movable rod $D^2$ from turning on its axis in such manner as to throw the V socket at its upper end out of proper alinement. A coiled spring $D^5$ surrounding the reciprocating rod and bearing against the lower side of the collar thereon, serves to hold the rod in its upper position.

The plunger $D^6$ which coöperates with the die in forming the V-shaped hook is itself V-shaped and reciprocated by means of a hollow sliding frame $D^7$ in which it is slidably mounted. The said frame is suspended in suitable ways on the front face of the machine, being held in its uppermost position by means of a coiled spring $D^8$ attached to a double link $D^9$ on the upper frame end. Projecting into this link and bearing upon an anti-friction roller $D^{10}$ in the sliding frame is an arm $D^{11}$ pivoted at one end and operated by a cam $D$ fixed upon the end of the operating shaft. This cam throws the arm downward intermittently and consequently moves the frame carrying the V plunger into the die.

The V-shaped plunger itself is located at one end of a rod $D^{12}$ vertically reciprocatable in guide openings in the hollow frame. An adjustable collar $D^{13}$ is fixed to the rod and a coiled spring bears against said collar and against the upper crosshead of the frame thrusting the plunger downward as far as the said collar will permit it to travel. Lateral projections $D^{14}$ from the collar bear against the face of the ways in which the hollow frame slides and prevent the rotation of the plunger rod, thus keeping the V plunger in proper alinement.

Fixed in the lower end of the sliding frame $D^7$ by means of a set screw $D^{15}$ is a hollow sleeve $D^{16}$ through which the lower end of the plunger rod passes. Owing to the fact that this sleeve is fixed to the frame, its reciprocations are co-extensive with those of the frame itself, whereas it will be plain that the plunger $D^6$ passing through this sleeve may have a limited reciprocation and therefore may be stopped in its path of movement short of the point which it would reach if it were fixed to the sliding frame. I regulate the stroke of the plunger and the point at which it is stopped in its downward movement preferably by means of one of the projections $D^{14}$ striking against the head of the screw $D^{17}$ fixed to the ways of the frame at a suitable point near the lower end thereof. I prefer that this screw head be eccentric to the axis of the screw so that the point at which the collar and the plunger will be stopped may be adjusted and varied to suit conditions.

By the arrangement just described it will be seen that if the operating cam $D$ be properly timed the V plunger will descend upon the short wire length immediately upon the severance of such length by the shearing knife, and force the short wire section into the die, causing it to be bent in the V shape shown in Fig. 6. The depth of the V will depend, of course, upon the dimensions of the tools,—that is to say, the plunger and the die employed, it being assumed that the feeding apparatus and knife are adjusted to cut a sufficient length for each hook. The plunger, it will be seen, forces the wire down into the socket of the reciprocatable rod in the die and further pushes the rod downward against the resistance offered by the spring thrusting the latter upward, the strength of the spring controlling the plunger being greater than that of the spring supporting the rod having the V-shaped socket therein.

As soon as one of the projections $D^{14}$ of the collar $D^{13}$ immediately back of the V portion abuts against the upper edge of the screw head $D^{17}$ of the die, the downward motion of the plunger will cease, but the sliding frame in which it is mounted will continue its downward movement carrying with it the sleeve $D^{16}$ fitted in the lower end of the frame and through which the plunger passes. The result of this movement will obviously be that the edge of the moving sleeve $D^{16}$ will catch the projecting ends of the wire section and bend them downwardly over the fixed sleeve $D'$, after the manner shown in Fig. 7, giving the V hook the proper form for the use to which it is put. The plunger and the movable sleeve over the end thereof will then be retracted by the spring supporting the sliding frame as soon as the cam by which they are operated passes out of the way.

Upon the retraction of the plunger the reciprocatable rod D² of the die will rise under the influence of its spring and lift the V hook up from the die so that it may be ejected from the machine. It frequently happens that the hook so formed adheres to the plunger itself instead of remaining in the die socket, and consequently I have found it advantageous to provide an ejecting apparatus capable of stripping the hook from the plunger should such an emergency arise.

The ejecting apparatus comprises a short rod E' mounted in a bushing in the front part of the frame positioned to move between the plunger and the die and suitably shaped with a V trough at the front end to strip the plunger of any hook adhering thereto. For the purpose of giving the stripper the quick snappy motion desirable for effective operation, I provide a spring E² secured to the frame for throwing it forward at the proper moment. The stripper and the spring, however, are normally held back by means of a rocking arm E³ pivotally mounted on the front plate of the frame, one end of the arm being loosely connected to the end of the stripper and the other end of the arm bearing against the face of a cam E mounted on the operating shaft. This cam has a deep notch therein, indicated by dotted lines in Fig. 4, adapted to suddenly release the end of said lever and permit the spring to throw the stripper forward quickly so as to effect the ejectment of the hook from the space between the plunger and the die, into any receptacle that may be suitably placed to receive it. The stripper is, of course, immediately withdrawn by the cam referred to, said cam having proper contour for this purpose.

It will be seen that the apparatus described will effectively and automatically draw wire from a reel, sever it into proper lengths and form a V-shaped double hook from such lengths and eject the same without the necessity for any manipulation whatever by the operator.

It will further be seen that the construction is such as to permit of any desired adjustment necessary for varying the length of wire sections to be converted into hooks, and the depths of the V's to be formed on such hook.

Having thus described my invention, I claim:

1. A machine for making a V-shaped double hook, comprising a die having a yielding socket member within relatively stationary edges, a plunger reciprocable relative to said socket member and means movable over the said edges for turning down the hook ends.

2. A machine for making a V-shaped double hook, comprising a yielding die socket and a plunger movable relative to each other, and bending means outside the socket and relatively movable toward the socket for turning back the projecting ends of the hook.

3. A machine for making V-shaped double hooks, comprising two sleeve members and a plunger, one sleeve member having an independent socket member positioned to receive the plunger, the other sleeve member movable toward and over said socket containing member.

4. A machine for making V-shaped double hooks, comprising a die member having a yielding socket section and a sleeve, a plunger relatively movable to said die, a sleeve about said plunger and movable relatively thereto and of a width sufficient to pass on the outside of the sleeve of the die member.

5. A machine for making V-shaped double hooks, comprising a plunger and a socket member, means for feeding wire between said members, means for automatically cutting off the wire fed therebetween, means for effecting relative reciprocation between the socket and plunger members, and bending means adapted to pass on the outside of the socket member, and means for effecting relative movement of the bending means and the socket member toward each other.

6. Means for making V-shaped double hooks, comprising wire feeding means, wire cutting means, a socket member and a plunger member, means for effecting relative movement between the two members, a sleeve movable with and relatively to the plunger member and movable relatively to and outside of the socket member.

7. A machine for making V-shaped double hooks, comprising a socket member and a plunger movable relative to each other, means for effecting said relative movement, and ejecting means positioned to pass between the socket member and the plunger in close proximity to each of them, and means for effecting reciprocation of the stripping means.

In testimony whereof, I hereunto affix my signature in the presence of two witnesses.

JOHN T. FAGAN.

Witnesses:
H. R. SULLIVAN,
J. M. WOODWARD.